United States Patent Office 2,991,883
Patented July 11, 1961

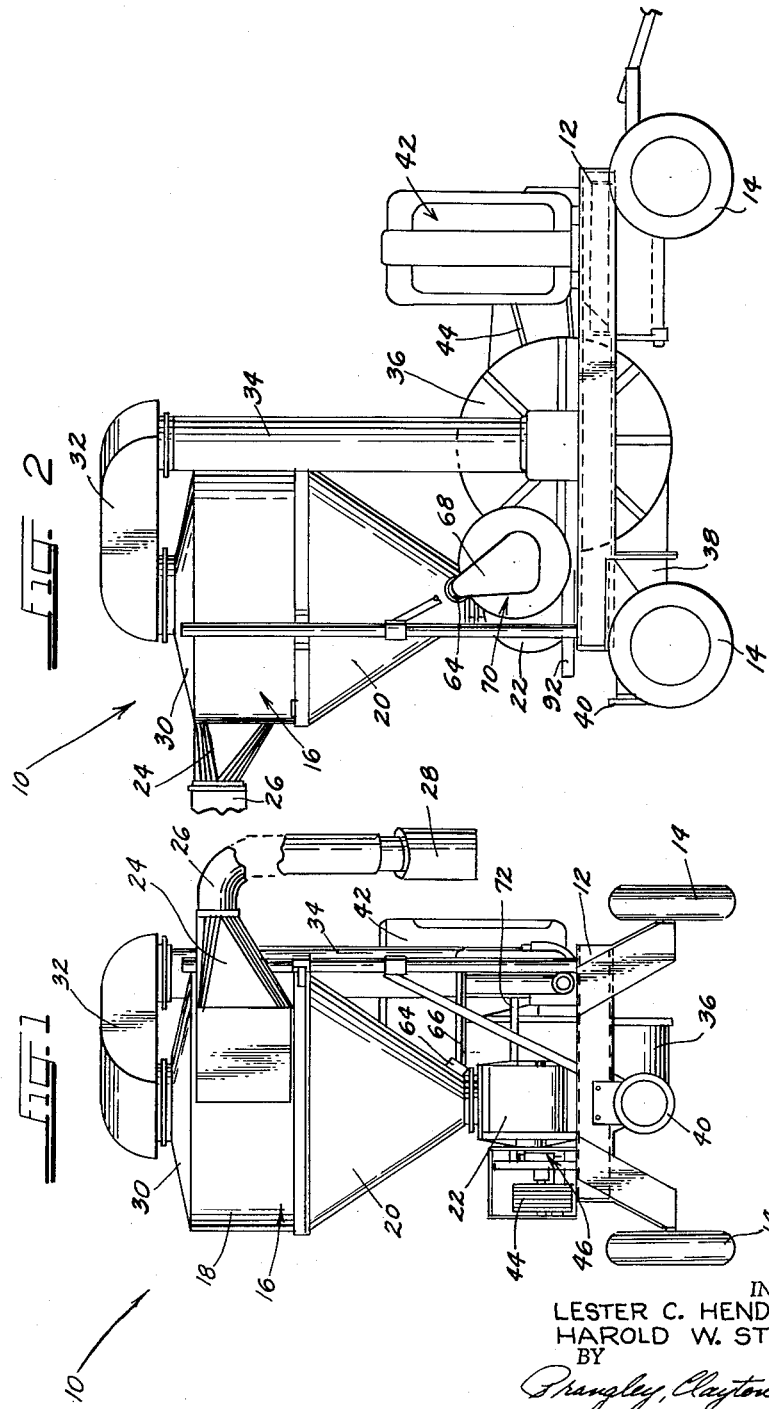

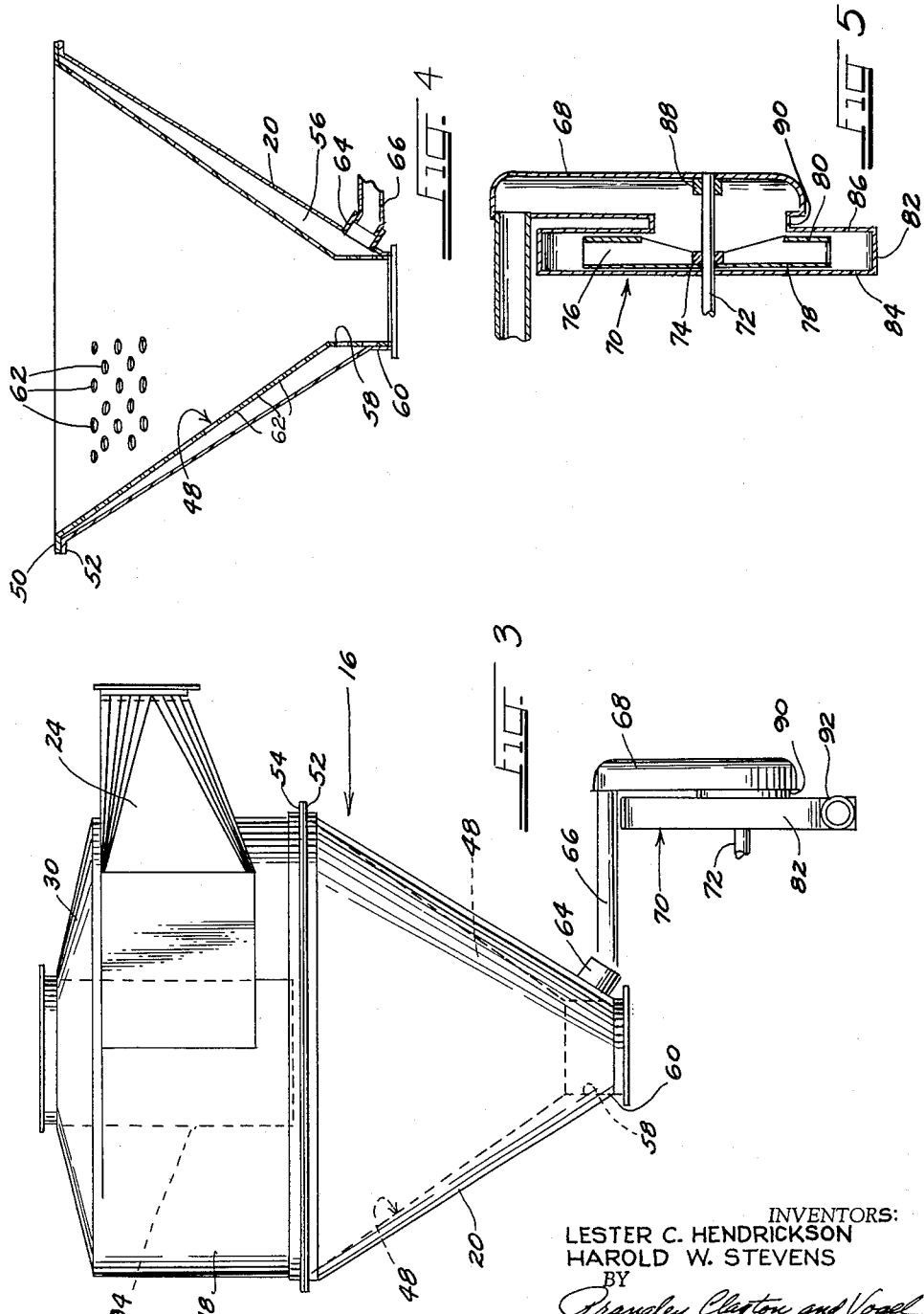

2,991,883
GRAIN HANDLING MACHINE
Lester C. Hendrickson, Geneva, Ill., and
Harold W. Stevens, Streator, Ill.
Filed May 10, 1957, Ser. No. 658,392
4 Claims. (Cl. 209—144)

This invention relates to conveyors and more particularly to pneumatic conveyors for conveying grain including mechanism for cleaning the grain during conveying thereof.

The conveyor of this invention is of the type wherein a fan creates a stream of moving air which picks up the grain to be moved. The grain is separated from the conveying air stream in a so-called "cyclone" and dropped through a valve into a discharge stream of air. Grain to be moved by such conveyors often has present in it fines, broken grain, dirt, rodent pellets and other undesirable contaminating materials. Various devices have been provided to remove the foreign material from the grain. These prior devices have often been unsatisfactory in use because of their bulk, inefficiency and difficulty of moving.

More specifically, the conveyor of the present invention in one preferred form may be mounted upon a trailer for easy portablity. The conveyor may be used to move grain from a truck into a tall bin or storage building. The discharge point for the grain being conveyed may be elevated a substantial distance above the main working parts of the conveyor including the cyclone. Prior devices which have been situated near the grain discharge can be used only with difficulty in such installations.

Accordingly, it is an important object of the present invention to provide an improved grain conveyor of the type set forth including mechanism to clean the grain being conveyed.

Another object of the invention is to provide a grain conveyor having grain cleaning mechanism incorporated therein, in which the cleaning device is incorporated into the principal conveying equipment and spaced from the grain discharge.

Yet another object of the invention is to provide in a grain conveyor of the type set forth a cleaning attachment which is incorporated in a cyclone.

In conjunction with the foregoing object it is another object of the invention to provide a grain conveyor having a grain cleaning mechanism incorporated in a cyclone which is mounted and arranged for easy portability.

A further object of the invention is to provide an improved grain conveyor with grain cleaning mechanism incorporated therein in which improved mechanism is provided to remove the cleanings and foreign material from the cleaning mechanism.

These and other objects of the present invention will be apparent from the following description when taken in conjunction with the accompanying drawings. In the drawings, wherein like reference numerals have been utilized to designate like parts throughout;

FIGURE 1 is an end elevational view with certain portions broken away of a grain conveyor made in accordance with and embodying the principles of the present invention;

FIGURE 2 is a side elevational view of the grain conveyor of FIGURE 1;

FIGURE 3 is an elevational view on an enlarged scale of the cyclone and cleanings discharge mechanism forming a part of the conveyor of the present invention;

FIGURE 4 is a view in vertical section through the cleaning screen and cone illustrated in FIGURE 3 of the drawings with certain parts broken away; and FIGURE 5 is a view in vertical cross section through the cleanings screen and discharge mechanism.

Referring first to FIGURES 1 and 2 of the drawings, there is shown a grain conveyor generally designated by the numeral 10 made in accordance with and embodying the principles of the present invention. Conveyor 10 has been illustrated as being mounted upon a wheeled frame for easy portablity. It is to be understood that many features and advantages of this invention are fully realized when the invention is incorporated in a stationary or permanent grain conveying installation.

Conveyor 10 of the present application is shown mounted upon a frame 12 supported for easy portability upon wheels 14. Mounted on one end of frame 12 is a cyclone or grain and air separator generally designated by the numeral 16. Separator 16 includes a cylindrical portion 18 mounted on top of a cone 20 which is disposed with the smaller diameter end thereof positioned downwardly. The lower end of cone 20 is connected to the input of a conventional vacuum valve or air lock 22 through which the grain is discharged.

A tangential connector 24 is provided on cylindrical portion 18 and is positioned to feed a stream of air and grain tangentially into the cylindrical portion 18 of the separator 16. Connector 24 has attached thereto a suction pipe or hose 26 which is preferably flexible throughout the length thereof. The outermost end of hose 26 is provided with a pickup nozzle 28 which is adapted to be disposed in the grain to be conveyed.

The upper end of cylindrical portion 18 is substantially closed by a top 30. Connected with the center of top 30 is a pipe 32 extending laterally from separator 16 and connecting with a vertically disposed pipe 34. The lower end of pipe 34 is connected to the intake side of a fan 36. The fan 36 may comprise a single fan section or may be preferably a multiple stage air turbine with the stages series connected and is effective to draw a stream of air through nozzle 28 and pipe 26 into separator 16. The grain falls downwardly into cone 20 and into the vacuum valve 22. The air stream travels through pipe 32 and pipe 34 to the inlet or eye of fan 36.

The outlet from the fan 36 discharges into a pipe 38. Preferably a discharge hose (not shown) is attached to a coupling 40 provided on the outer end of discharge pipe 38.

Also mounted upon frame 12 is a suitable prime mover generally designated by the numeral 42. Prime mover 42 has been illustrated as a gasoline powered internal combustion engine. The output from engine 42 is delivered by means of a belt 44 to a suitable arrangement of pulleys to drive turbine 36. Suitable connection is also made to vacuum valve 22 through a drive mechanism generally designated by the numeral 46 in FIGURE 1 of the drawings. This drive for vacuum valve 22 is operated to cause grain separated in cone 20 to be moved through valve 22 and into discharge pipe 38 without destroying the area of reduced air pressure created within separator 16 by the air fan 36.

The structure of the grain cleaning mechanism is best illustrated in FIGURES 3 to 5 of the drawings. Referring first to FIGURE 3, it will be seen that the cone 20 has mounted therein an apertured cleaning cone or screen generally designated by the numeral 48. Screen 48 divides separator 16 into a grain chamber (above the screen) and a cleanings chamber (below the screen). Cleaning screen 48 is also generally conical in shape, the greatest dimension thereof being slightly less than the greatest dimension of separator cone 20. Preferably the upper end of cleaning cone 48 is provided with an outwardly directed flange 50 cooperating with flanges 52 and 54 on cone 20 and housing 18 whereby to mount cleaning cone 48 within housing cone 20. The slope of the sides of cleaning cone 48 is slightly greater than the slope of the sides of cone 20 whereby to provide therebetween a substantial area generally designated by the numeral 56 and providing a cleanings chamber. A short cylindrical portion 58 is provided adjacent to the end of cone 48 which extends downwardly and is connected to the lower end 60 of outer cone 20.

Cone 48 is provided with a plurality of apertures 62 throughout the area thereof (only a few apertures having been shown for purposes of illustration). The size and disposition of apertures 62 will vary depending upon the material being conveyed by machine 10. In general, apertures 62 must have a size which will permit fines, broken material and other unwanted material or cleanings to pass therethrough but will prevent the desired material from passing therethrough. In the case of corn, for example, apertures 62 are preferably formed with a diameter of one-fourth inch and are staggered on five-sixteenths inch centers whereby to provide 58% open areas. It has been found that this screen 48 will efficiently and rapidly clean corn by permitting the fines and cleanings to pass through apertures 62 while preventing passage of the desired corn therethrough.

It is necessary to remove the cleanings from the area 56 between cones 20 and 48. To this end, an outlet pipe 64 is secured to cone 20 and communicates with the interior thereof through an aperture therein. Pipe 64 is positioned adjacent to the lower end of cone 20 and therefore communicates with the area or chamber 56 between cones 20 and 48 at substantially the bottom thereof. A second pipe 66 has one end thereof connected to pipe 64 and the other end thereof connected to yet another pipe 68. Pipe 66 is preferably horizontally disposed, while pipe 68 is substantially vertically disposed.

Means is provided to produce an area of reduced air pressure within cleanings gathering area 56 between cones 20 and 48 by means of a second vacuum fan generally designated by the numeral 70. More specifically, the lower end of pipe 68 connects with the eye at the input side of fan 70 whereby to provide an area of reduced pressure through pipes 64, 66 and 68 to the cleanings gathering area 56.

Referring particularly to FIGURE 5 of the drawings, it will be seen that fan 70 is mounted upon a shaft 72 which is connected to and driven by the drive mechanism 46 (see FIGURE 1). Accordingly, prime mover 42 is utilized to impart the necessary motion to the moving parts of fan 70. Mounted upon shaft 72 is a hub 74 from which extends outwardly a plurality of vanes 76. Vanes 76 are also attached along one radially extending edge thereof to a first circular plate 78. A second annular plate 80 is also provided and to it are connected the other radially extending edges of vanes 76. Surrounding vanes 76 is a substantially cylindrical closed housing including a cylindrical portion 82 to which is connected a pair of circular portions 84 and 86. Housing member 84 has an aperture therein through which extends fan shaft 72, the right hand end of shaft 72 as viewed in FIGURE 5 being received in bearing 88. Housing member 86 is provided with an aperture in the center thereof and the material surrounding the aperture is joined to a cylindrical housing member 90 which is connected to an opening in pipe 68. An outlet from the fan housing is provided adjacent to the bottom thereof in the form of a discharge pipe 92 which is directed in the same direction as the grain discharge pipe 38 described above.

In operation, the conveyor 10 is moved into position adjacent to the grain to be moved. The grain to be moved may be in a truck which has been used to haul the grain, or the grain may be in a storage bin or other storage facility. In certain instances, the grain is to be moved from a truck into a storage facility such as a bin or warehouse, or into another transfer facility such as a railroad car or a barge. In other instances, the grain is to be moved from a storage facility such as a bin or warehouse, into a truck, barge, railroad car or the like. Often the grain must be discharged at a point some distance away from the conveyor 10 and often it is desirable to discharge the grain at some point elevated above the top of conveyor 10, such as in an elevated storage facility or in an elevator. In many instances, the discharge point may be as much as thirty feet or more above the conveyor 10.

The conveyor 10 of this invention can be used simultaneously to convey and clean grain in the following manner. Conveyor 10 is moved to a point adjacent to the facility in which the grain is positioned. Motor 42 is started whereby to generate an area of reduced pressure within separator 16. In a typical construction, the pressure within separator 16 may be as much as five inches of mercury below the pressure of the surrounding atmosphere when the bottom of cone 20 is closed. Pickup nozzle 28 is then inserted into the grain to be conveyed. The area of reduced pressure within separator 16 created by turbine 36 causes a stream of air with grain carried thereby to flow through nozzle 28 and pipe 26 into separator 16. The combined stream of grain and air flows into the cylindrical portion 18 of separator 16 in a tangential manner and the inertia thereof acting against the cylindrical walls of housing 18 causes the stream of air and grain to swirl within separator 16. The grain, including the undesirable foreign matter therein, gradually falls downwardly across the cleaning screen 48 while it is being driven and thrown circumferentially around the inner surface thereof. The apertures 62 in cleaning cone 48 prevent the grain, such as corn, to be carried therethrough. Accordingly, all the grain is retained within cleaning cone 48. However, fines, dirt, rodent pellets and other undesirable material having a size such that they can pass through apertures 62 will be carried by their momentum into space 56 between cones 20 and 48.

When prime mover 42 is set in operation, fan 70 also begins to operate whereby to produce an area of reduced pressure within space 56. The dimensions of the parts are such that fan 70 can create an area of reduced pressure within space 56 which may be, for example, three inches of mercury below the surrounding atmospheric pressure. When a stream of air and grain is entering separator 16, the area of reduced pressure within separator 16 drops from a value of approximately five inches of mercury below atmospheric pressure to approximately two and one-half inches of mercury below atmospheric pressure. Accordingly, the area of reduced pressure within space 56 is at a slightly lower pressure than that within cone 48. The pressure differential between space 56 and the area within cone 48 combined with the centrifugal momentum of the fines and other cleanings will cause the cleanings to pass through apertures 62. The collected cleanings fall downwardly along the inner walls of cone 20 and to the bottom of space 56. Due to the action of fan 70, the cleanings are then carried through pipes 64, 66 and 68 and into the eye of fan 70. Fan 70 discharges the cleanings through pipe 92. Preferably there is attached to pipe 92 a suitable collecting bag (not shown) which will permit the air carried with the cleanings to pass therethrough but will retain the cleanings therein.

The air stream created by the main fan 36 and carried through nozzle 28 of pipe 26 is separated from the grain and cleanings within separator 18. More specifically, a cylindrical pipe 94 (see FIGURE 3 of the drawings) is connected as an extension of pipe 32 (see FIGURE 1) within cylindrical housing 18. The manner of entry of the combined air and grain into separator 16 throws the grain to the periphery of housing 18, as has been explained above, whereby to separate the grain from the air stream. The air stream then passes upwardly through pipe 94 and into pipe 32. From pipe 32 the air stream is carried downwardly through pipe 34 and into the eye of the main fan 36. The air stream is then discharged from the fan 36 through discharge pipe 38.

The clean grain with the cleanings removed therefrom falls downwardly across the inner surface of screen 48 and downwardly through the cylindrical portion 58 thereof. The lower end of cylindrical portion 58 is connected to the input of the vacuum valve 22. Vacuum valve 22 serves to pass the cleaned grain from cone 48 and put it into the discharge pipe 38. This transfer of the cleaned grain is effected without destroying the area of reduced pressure within the separator 16 as is well known in the art. The cleaned grain can then be delivered to any desired point by means of a suitable hose (not shown) connected to discharge pipe coupling 40.

Although a certain preferred form of the invention has been shown for purposes of illustration, it is to be understood that various changes and modifications can be made therein without departing from the scope thereof. Accordingly, the invention is to be limited only as set forth in the following claims.

We claim:

1. A vacuum conveyor and cleaner for grain, comprising a separator, an air and grain inlet pipe connected to the top portion of said separator, an air outlet pipe connected to the top portion of said separator in spaced relation to said inlet pipe, a screen mounted in said separator and dividing said separator into an inner grain chamber and an outer cleanings chamber, means to withdraw air from said separator through said air outlet pipe for creating an area of reduced pressure within said separator, to draw a stream of air having grain and cleanings therein into said grain chamber through said inlet pipe, said cleaning screen having perforations retaining said grain within said grain chamber and permitting passage of the cleanings into said outer cleanings chamber, means separate from said air withdrawing means for creating a further reduced pressure in said cleanings chamber to draw the cleanings from the grain chamber through said screen into said cleanings chamber and to remove the cleanings from said cleanings chamber, and means to remove the cleaned grain from said grain chamber.

2. A vacuum conveyor and cleaner for grain, comprising a separator, an air inlet pipe connected to the top portion of said separator, an air outlet pipe connected to the top portion of said separator in spaced relation to said inlet pipe, a screen mounted in said separator below said air inlet and air outlet pipes and dividing said separator into an inner grain chamber and an outer cleanings chamber, an air fan having its inlet connected to said outlet pipe to produce a vacuum in said separator grain chamber and having an outlet pipe for air under pressure, said grain chamber having an outlet, a vacuum valve connected between said grain chamber outlet and said fan outlet pipe for delivering grain by gravity from said grain chamber to said fan outlet pipe to discharge the grain, said screen having perforations therein retaining said grain within said grain chamber and permitting passage of the cleanings from said grain chamber into said outer cleanings chamber, and an air suction means separate from said fan connected to said cleanings chamber for producing a higher vacuum in said cleanings chamber to draw the cleanings from said grain chamber through said screen into said cleanings chamber and to remove the cleanings from said cleanings chamber.

3. A vacuum conveyor and cleaner for grain, comprising a separator having a cone shaped wall portion positioned with the smaller diameter thereof at the bottom, a cone shaped screen mounted in said cone shaped wall portion of said separator and dividing said separator into an inner grain chamber and an outer cleanings chamber, the slope of said cone shaped wall portion relative to the vertical being less than the slope of said cone shaped screen relative to the vertical whereby said cleanings chamber formed therebetween has a cross section progressively increasing in area from top to bottom thereof, an air and grain inlet pipe connected to said separator above said screen, an air outlet pipe connected to said separator above said screen in spaced relation to said inlet pipe, means for withdrawing air from said separator through said outlet pipe to create a vacuum within said separator to draw a stream of air having grain and cleanings therein into said separator through said inlet pipe, said screen having perforations therein retaining the grain within said grain chamber and permitting passage of the cleanings from said grain chamber into said cleanings chamber, an air fan connected to said separator adjacent to the bottom of said cone shaped wall portion and communicating with said cleanings chamber and creating a vacuum within said cleanings chamber greater than the vacuum created in said grain chamber by the withdrawal of air through said outlet pipe whereby to withdraw the cleanings from said grain chamber through said screen into said cleanings chamber and to remove the cleanings from said cleanings chamber, and means to discharge the cleaned grain from said grain chamber.

4. A portable vacuum conveyor and cleaner for grain, comprising a wheeled frame, a separator mounted upon said frame and having a cone shaped wall portion positioned with the smaller diameter thereof at the bottom, a cone shaped cleaning screen mounted within said cone shaped wall portion and dividing said separator into an inner grain chamber and an outer cleanings chamber, said cleanings chamber being defined by said cone shaped cleaning screen and said cone shaped wall portion of said separator, a first power driven air fan on said frame and having its inlet pipe connected to said separator above said screen, an air and grain inlet pipe connected to said separator above said screen in spaced relation to the connection of said first fan inlet pipe, the slope of said cone shaped wall portion with respect to the vertical being less than the slope of said cone shaped cleanings screen with respect to the vertical whereby said cleanings chamber formed therebetween is of progressively increasing cross sectional area from top to bottom of said separator, said cleanings screen having perforations therein retaining the grain within said grain chamber and permitting the passage of the screenings from said grain chamber into said cleanings chamber, and a second fan mounted on said frame and connected to said cleanings chamber adjacent to the bottom of said separator for creating in said cleanings chamber a lower air pressure than that created inside the screen by said air withdrawing means to draw the cleanings from said grain chamber through the screen into said cleanings chamber and for discharging the cleanings through said second fan.

References Cited in the file of this patent

UNITED STATES PATENTS

| | | |
|---|---|---|
| 247,277 | Stevens | Sept. 20, 1881 |
| 1,528,983 | Montgomery | Mar. 10, 1925 |
| 1,680,243 | Becker | Aug. 7, 1928 |
| 1,701,126 | Schiff | Feb. 5, 1929 |
| 1,735,479 | Sturtevant | Nov. 12, 1929 |
| 1,905,458 | Gaffney | Apr. 25, 1933 |
| 2,094,438 | Watson | Sept. 28, 1937 |
| 2,219,453 | Mosley | Oct. 29, 1940 |
| 2,389,715 | Beardsley | Nov. 27, 1945 |
| 2,471,326 | Hoyt | Mar. 24, 1949 |
| 2,890,764 | Arnold | June 16, 1959 |

FOREIGN PATENTS

| | | |
|---|---|---|
| 162,475 | Australia | Apr. 15, 1955 |